United States Patent
Gledhill et al.

(10) Patent No.: US 9,476,258 B2
(45) Date of Patent: Oct. 25, 2016

(54) PDC CUTTER WITH CHEMICAL ADDITION FOR ENHANCED ABRASION RESISTANCE

(71) Applicant: DIAMOND INNOVATIONS, INC., Worthington, OH (US)

(72) Inventors: Andrew Gledhill, Westerville, OH (US); Christopher Long, Westerville, OH (US)

(73) Assignee: Diamond Innovations, Inc., Worthington, OH (US)

( * ) Notice: Subject to any disclaimer, the term of this patent is extended or adjusted under 35 U.S.C. 154(b) by 686 days.

(21) Appl. No.: 13/926,696

(22) Filed: Jun. 25, 2013

(65) Prior Publication Data
US 2014/0374172 A1    Dec. 25, 2014

(51) Int. Cl.
| | |
|---|---|
| *E21B 10/567* | (2006.01) |
| *B24D 3/06* | (2006.01) |
| *C22C 26/00* | (2006.01) |
| *B01J 3/06* | (2006.01) |
| *B24D 3/10* | (2006.01) |
| *C04B 41/50* | (2006.01) |

(52) U.S. Cl.
CPC ............ *E21B 10/567* (2013.01); *B24D 3/06* (2013.01); *B01J 3/062* (2013.01); *B24D 3/10* (2013.01); *C04B 41/5002* (2013.01); *C04B 2235/427* (2013.01); *C22C 26/00* (2013.01)

(58) Field of Classification Search
CPC .......... E21B 10/567; E21B 2010/561; C04B 41/5002; C04B 2235/427; C22C 2/006; B24D 3/10; B24D 3/06; B01J 3/062
See application file for complete search history.

(56) References Cited

U.S. PATENT DOCUMENTS

| | | | |
|---|---|---|---|
| 2,992,900 A | 7/1961 | Bovenkerk | |
| 3,148,161 A | 9/1964 | Wentorf et al. | |
| 3,268,457 A | 8/1966 | Giardini | |
| 3,297,407 A | 1/1967 | Wentorf | |
| 3,310,501 A | 3/1967 | Darrow et al. | |
| 4,128,625 A | 12/1978 | Ishizuka | |
| 4,147,255 A | 4/1979 | Ishizuka | |
| 4,518,659 A * | 5/1985 | Gigl | B01J 3/062 419/11 |
| 4,959,201 A | 9/1990 | Satoh et al. | |
| 5,273,730 A | 12/1993 | Yoshida et al. | |
| 5,454,343 A | 10/1995 | Eun et al. | |
| 5,503,104 A | 4/1996 | Spiro | |
| 5,769,176 A | 6/1998 | Sumiya et al. | |
| 5,908,503 A | 6/1999 | Sumiya et al. | |
| 8,771,391 B2 * | 7/2014 | DiGiovanni | B22F 3/10 419/35 |
| 2008/0302579 A1 * | 12/2008 | Keshavan | B22F 7/08 175/434 |

(Continued)

FOREIGN PATENT DOCUMENTS

| | | |
|---|---|---|
| EP | 0322217 A1 | 6/1989 |
| WO | 8304016 A1 | 11/1983 |

OTHER PUBLICATIONS

C.M.Sung "Optimized cell design for high-pressure synthesis of diamond", High Temperatures—High Pressures—2001, vol. 33, p. 489-501.

*Primary Examiner* — Nicole Coy
(74) *Attorney, Agent, or Firm* — Keith G DeMaggio

(57) ABSTRACT

A superabrasive cutter and a method of making the superabrasive cutter are disclosed. The superabrasive cutter may comprise a plurality of polycrystalline superabrasive particles and about 0.01% to about 4% by weight of the superabrasive particles of a metal or metal alloy. The metal or the metal alloy may be immiscible with a catalyst for forming the polycrystalline superabrasive particles.

21 Claims, 5 Drawing Sheets

(56) References Cited

U.S. PATENT DOCUMENTS

| | | |
|---|---|---|
| 2010/0186303 A1 | 7/2010 | Davies |
| 2010/0199573 A1 | 8/2010 | Montross et al. |
| 2011/0278074 A1 | 11/2011 | Lungisani |
| 2012/0012402 A1 | 1/2012 | Thigpen et al. |
| 2012/0272583 A1 | 11/2012 | Frushour |
| 2014/0360791 A1* | 12/2014 | Bowden ................ E21B 10/567 175/432 |

* cited by examiner

PDC CUTTER WITH CHEMICAL ADDITION FOR ENHANCED ABRASION RESISTANCE

TECHNICAL FIELD AND INDUSTRIAL APPLICABILITY

The present invention relates generally to superabrasive materials and a method of making superabrasive materials; and more particularly, to a polycrystalline diamond (PDC) cutter with chemical addition for enhanced abrasion and its method of making the same.

SUMMARY

In one embodiment, a superabrasive cutter may comprise a plurality of polycrystalline superabrasive particles; and about 0.01% to about 4% by weight of the superabrasive particles of a metal or metal alloy, wherein the metal or the metal alloy is immiscible with a catalyst for forming the polycrystalline superabrasive particles.

In another embodiment, a method may comprise steps of mixing a metal or metal alloy with a plurality of superabrasive particles; providing a substrate attached to a superabrasive volume formed by the plurality of superabrasive particles with the metal or metal alloy; and subjecting the substrate and the superabrasive volume with the metal or metal alloy to conditions of elevated temperature and pressure suitable for producing the polycrystalline superabrasive material, wherein the metal or metal alloy is immiscible to a catalyst from the substrate.

In yet another embodiment, a superabrasive cutter may comprise a plurality of polycrystalline superabrasive particles; and a metal or metal alloy distributed throughout the polycrystalline superabrasive particles wherein an overall concentration of the metal or metal alloy is less than that of a catalyst for forming the polycrystalline superabrasive particles, wherein the metal or metal alloy is lead or an alloy thereof.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
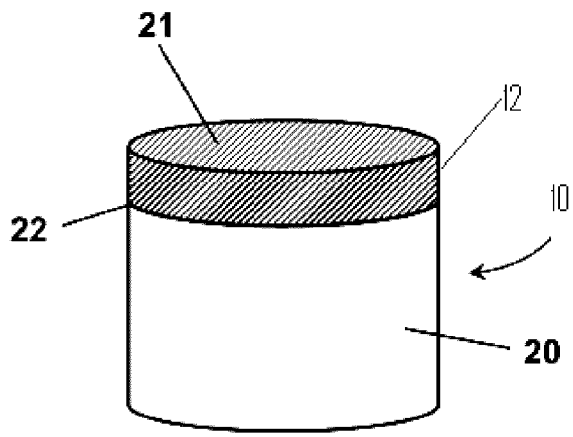
FIG. 1 is schematic perspective view of a cylindrical shape PDC cutter blank produced in a HPHT process.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50 means in the range of 45-55.

As used herein, the term "superabrasive particles" may refer to ultra-hard particles or superabrasive particles having a Knoop hardness of 5000 KHN or greater. The superabrasive particles may include diamond, and cubic boron nitride, for example.

Polycrystalline diamond composite (or "PDC", as used hereafter) may represent a volume of crystalline diamond grains with embedded foreign material filling the inter-grain space. In one particular case, composite comprises crystalline diamond grains, bound to each other by strong diamond-to-diamond bonds and forming a rigid polycrystalline diamond body, and the inter-grain regions, disposed between the bound grains and filled with a catalyst material (e.g. cobalt or its alloys), which was used to promote diamond bonding during fabrication. Suitable metal solvent catalysts may include the metal in Group VIII of the Periodic table. PDC cutting element (or "PDC cutter", as is used hereafter) comprises an above mentioned polycrystalline diamond body attached to a suitable support substrate, e.g., cemented cobalt tungsten carbide (WC—Co), by virtue of the presence of cobalt metal. In another particular case, polycrystalline diamond composite comprises a plurality of crystalline diamond grains, which are not bound to each other, but instead are bound together by foreign bonding materials such as borides, nitrides, carbides, e.g. SiC.

Polycrystalline diamond composites and PDC cutters may be fabricated in different ways and the following examples do not limit a variety of different types of diamond composites and PDC cutters which may be coated according to the embodiment. In one example, PDC cutters are formed by placing a mixture of diamond polycrystalline powder with a suitable solvent catalyst material (e.g. cobalt) on the top of WC—Co substrate, which assembly is subjected to processing conditions of extremely high pressure and high temperature (HPHT), where the solvent catalyst promotes desired inter-crystalline diamond-to-diamond bonding and, also, provides a binding between polycrystalline diamond body and substrate support. In another example, PDC cutter is formed by placing diamond powder without a catalyst material on the top of substrate containing a catalyst material (e.g. WC—Co substrate). In this example, necessary cobalt catalyst material is supplied from the substrate and melted cobalt is swept through the diamond powder during the HPHT process. In still another example, a hard polycrystalline diamond composite is fabricated by forming a mixture of diamond powder with silicon powder and mixture is subjected to HPHT process, thus forming a dense polycrystalline cutter where diamond particles are bound together by newly formed SiC material.

Abrasion resistance of polycrystalline diamond composites and PDC cutters may be determined mainly by the strength of bonding between diamond particles (e.g. cobalt catalyst), or, in the case when diamond-to-diamond bonding is absent, by foreign material working as a binder (e.g. SiC binder), or in still another case, by both diamond-to-diamond bonding and foreign binder.

The presence of some catalysts inside the polycrystalline diamond body of PDC cutter promotes the degradation of the cutting edge of the cutter during the cutting process, especially if the edge temperature reaches a high enough critical value. Probably, the cobalt driven degradation may be caused by the large difference in thermal expansion between diamond and catalyst (e.g. cobalt metal), and also by catalytic effect of cobalt on diamond graphitization. Removal of catalyst from the polycrystalline diamond body of PDC cutter, for example, by chemical etching in acids, leaves an interconnected network of pores and a residual catalyst (up to 10 vol %) trapped inside the polycrystalline diamond body. It has been demonstrated that a chemically etched polycrystalline diamond cutter by removal of a substantial amount of cobalt from the PDC cutter significantly improves its abrasion resistance. Also it follows that a thicker cobalt depleted layer near the cutting edge provides better abrasion resistance of the PDC cutter than a thinner cobalt depleted layer.

Embodiments disclose that a metal or a metal alloy may be blended with superabrasive particles. A superabrasive volume mixed with the metal or the metal alloy may be pressed in an elevated pressure and temperature. The metal or metal alloy, for example lead or an alloy thereof, may have a melting point lower than the catalyst. The metal or metal alloy may melt at low temperature, allowing for enhanced rearrangement of the diamond grains and increasing diamond density in the resulting PDC cutters.

In one embodiment, the metal or metal alloy may provide protection to free surfaces of the diamond, preventing diamond from graphitization in time before a catalyst, such as cobalt, swept from substrate, such as tungsten carbide during elevated temperature and pressure. It was known from the prior art that the lead melts at temperatures significantly below that of the cobalt at pressures lower than about 200 kbar, allowing for a partial filling of the pore structure existing between the diamond crystals and allowing for some rearrangement of the diamond grains. The molten lead additionally allowed for enhanced pressure transmission to the free surfaces of the diamond grains prior to the onset of the sweep-sinter process. Additionally, the lead coated the surface of individual diamond crystals, and act as a barrier stopping a conversion from diamond to graphite, or other glassy carbon forms. Upon reaching sufficient temperature for the melting of cobalt, the now liquid cobalt from the carbide support sweeps through the pore structure. Owing to the extremely limited solubility of lead in cobalt, the sweep is thought to push the majority of the lead to the top of can.

As shown in FIG. 1, a superabrasive cutter 10 which is insertable within a downhole tool, such as a drill bit (not shown) in according to an embodiment. One example of the superabrasive cutter 10 may include a superabrasive volume 12 having a top surface 21. The superabrasive cutter may comprise a plurality of polycrystalline superabrasive particles and about 0.01% to about 4% by weight of the superabrasive particles of a metal or metal alloy. The metal or the metal alloy may be immiscible with a catalyst for forming the polycrystalline superabrasive particles. In one embodiment, the metal or metal alloy is present in an amount by weight of the superabrasive particles of less than about 1.0%. In another embodiment, the metal or metal alloy is present in an amount by weight of the superabrasive particles of less than about 2.0%.

The superabrasive cutter 10 may include a substrate attached to the superabrasive volume 12 formed by the polycrystalline superabrasive particles. The substrate may be a metal carbide 20, attached to the superabrasive volume 12 via an interface 22 between the superabrasive volume 12 and the metal carbide 20. The metal carbide 20 may be generally made from cemented cobalt tungsten carbide, or tungsten carbide, while the superabrasive volume 12 may be formed using a polycrystalline ultra-hard material layer, such as polycrystalline diamond, polycrystalline cubic boron nitride ("PCBN"), or tungsten carbide mixed with diamond crystals (impregnated segments). The superabrasive particles may be selected from a group of cubic boron nitride, diamond, and diamond composite materials.

The metal or metal alloy may be lead or an alloy thereof. The metal or metal alloy may be distributed throughout the polycrystalline superabrasive particles. Concentration of the metal or metal alloy may be higher on the top surface 21 of the superabrasive volume 12 than that on the interface 22. The concentration gradient of the metal or metal alloy may be caused by the sweeping of the catalyst from the substrate 20 at elevated temperature and pressure. An overall concentration of the metal or metal alloy may be less than that of a catalyst for forming the polycrystalline superabrasive particles. The catalyst for forming the polycrystalline superabrasive particles may be cobalt, which may have from 5 to 10% by weight of the superabrasive particles. The metal or metal alloy may have a melting point lower than the catalyst.

The superabrasive cutter 10 may be fabricated according to processes known to persons having ordinary skill in the art. The cutting element 10 may be referred to as a polycrystalline diamond compact ("PDC") cutter when polycrystalline diamond is used to form the polycrystalline volume 12. PDC cutters are known for their toughness and durability, which allow them to be an effective cutting insert in demanding applications. Although one type of superabrasive cutter 10 has been described, other types of superabrasive cutter 10 may be utilized. For example, in some embodiment, superabrasive cutter 10 may have a chamfer (not shown) around an outer peripheral of the top surface 21. The chamfer may have a vertical height of 0.5 mm and an angle of 45° degrees, for example, which may provide a particularly strong and fracture resistant tool component.

Figure 2:
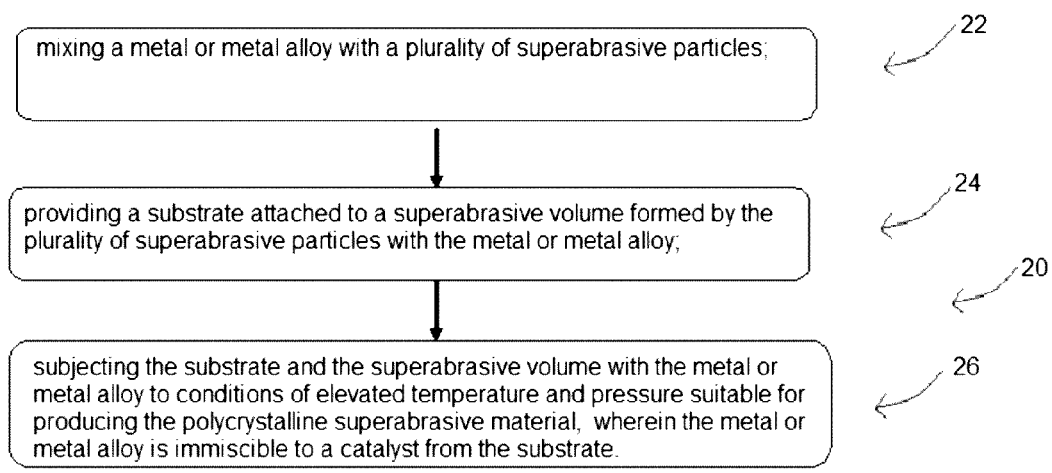
FIG. 2 is a flow chart illustrating a method of manufacturing a PDC cutter blank according to an embodiment.

As shown in FIG. 2, a method 20 of making superabrasive material may comprise steps of mixing a metal or metal alloy with a plurality of superabrasive particles in a step 22; providing a substrate attached to a superabrasive volume formed by the plurality of superabrasive particles with the metal or metal alloy in a step 24; and subjecting the substrate and the superabrasive volume with the metal or metal alloy to conditions of elevated temperature and pressure suitable for producing the polycrystalline superabrasive material, wherein the metal or metal alloy is immiscible to a catalyst from the substrate in a step 26.

The method 20 may include a step of surrounding the superabrasive particles with the metal or metal alloy to protect the superabrasive particles from converting back to graphite because the catalyst from the substrate may be swept into the superabrasive particles and help to convert the superabrasive particles to graphite. By introducing the metal or metal alloy, the density of the superabrasive volume may be increased. The volume fraction of superabrasive particles in the sintered body may be increased with the metal or metal alloy. Also by introducing the metal or metal alloy, the catalysts around superabrasive particles may be replaced by the metal or metal alloy. The abrasion resistance of the superabrasive cutter may in turn be increased. In one embodiment, the method 20 may include a step of mixing a metal or metal alloy with a plurality of superabrasive particles to form a superabrasive volume. In another embodiment, the method 20 may include a step of sandwiching the superabrasive particles with mixture of the metal or metal alloy between the substrate and the superabrasive particles without mixing with the metal or metal alloy. Specifically, at an elevated temperature and pressure, the catalyst from the substrate may sweep into the superabrasive particles with the metal or metal alloy and may push at least a part of the catalyst into the layer of superabrasive particles without the mixture of the metal or metal alloy.

One or more steps may be inserted in between or substituted for each of the foregoing steps 22-26 without departing from the scope of this disclosure.

Example 1

Diamond crystals with an average particle size of 18 micrometers were thoroughly mixed with 1 wt % fine lead powder, based on the diamond weight. This blend was then placed into a can material with a cobalt cemented tungsten carbide substrate, loaded into a high pressure cell with the appropriate gasketing materials. The blend together with the cobalt cemented tungsten carbide substrate was pressed under HP/HT conditions in a high pressure high temperature apparatus. In this example, the press was a belt press apparatus, and the cutters were pressed at greater than 55 kbar pressure and temperatures in excess of 1400° C.

Figure 3:
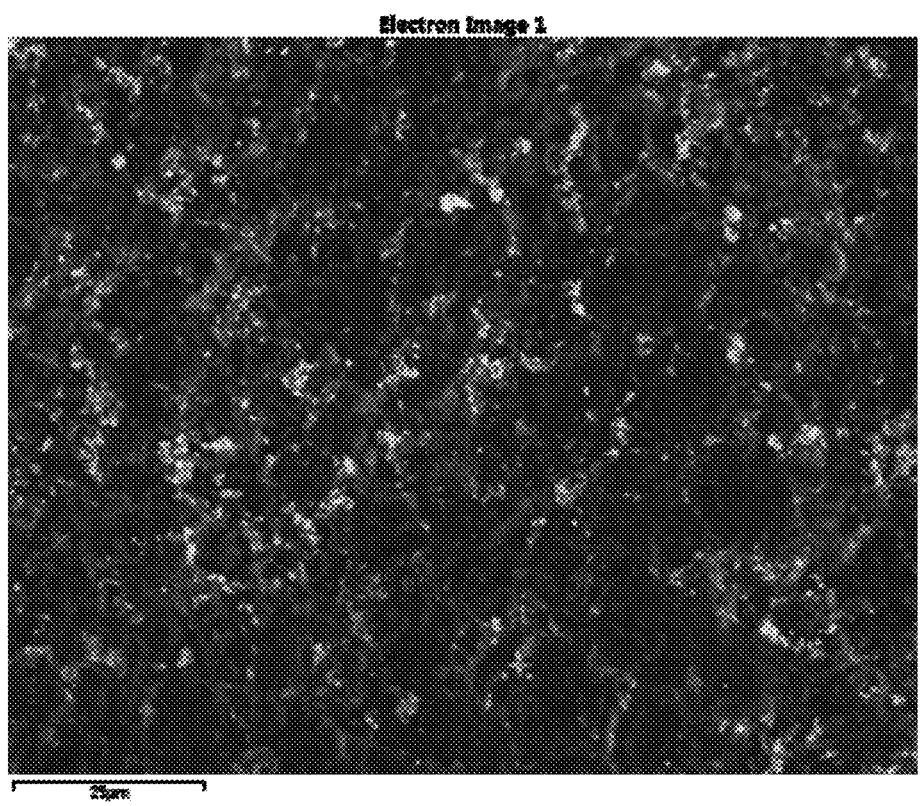
FIG. 3 is a back scattered scanning electron microscope (SEM) micrograph of the lapped diamond surface according to an embodiment.
Figure 4:
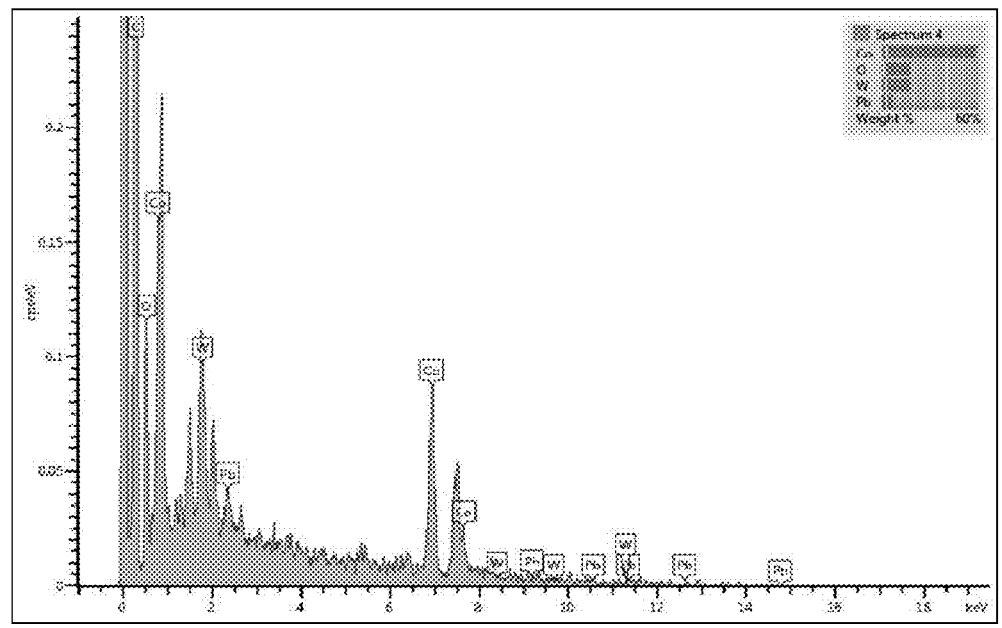
FIG. 4 is an energy dispersive spectrum with beam focused on a bright spot in the microstructure shown in FIG. 3.
Figure 5:
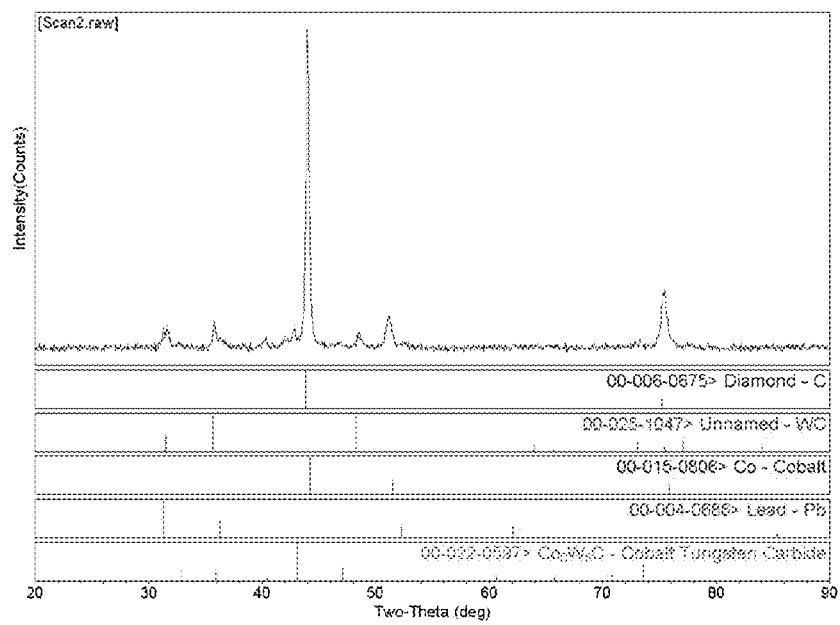
FIG. 5 is an X-ray diffraction spectrum on the lapped diamond surface according to an embodiment.

After being removed from the high pressure apparatus and gasketing material, the resulting body was ground to final dimensions and the diamond thickness was lapped to the desired thickness, which resulted in the removal of the majority of the lead present in the diamond structure, leaving a portion of the lead remaining in the microstructure, as shown in FIG. 3. In this scanning electron microscope (SEM) micrograph of the lapped diamond surface, three phases were detectable. The dark grains constituting the majority of the microstructure were grains of diamond. The dark gray phase between the diamond grains was the sweep metal, containing cobalt and tungsten from the sweep. Isolated bright spots within the microstructure contain a significant lead signal from the energy dispersive spectrometer (EDS), as shown in FIG. 4. Due to electron beam spreading and the ability for the electron beam in the microscope to penetrate a depth into the microstructure, a signal from cobalt, tungsten, and carbon were also displayed when obtaining the spectrum with the beam focused on a bright spot in the microstructure. X-ray diffraction (XRD) on the lapped diamond surface confirmed that these isolated pockets were metallic lead and not a reaction phase resulting from the reaction of lead with the other chemical species present in the system, as shown in FIG. 5.

A bevel of 45 degrees was ground onto the cutting edge of the cutters. The cutters were tested on a vertical torrent lathe (VTL) in testing methodology. Specifically, the cutter was tested such that the depth of cut is between 0.010" and 0.030" in one example, between 0.015" and 0.017" in another example, under a continuous flood of cooling fluid. The table may be rotated at a variable speed such that the cutter machined a constant amount of linear feet per minute. The surface feet per minute were between 200 and 600 in one example, between 350 and 425 feet/minute in another example. The cutter was cross-fed into the rock at a constant rate between 0.100" and 0.200" per revolution of the table. The cutter was mounted into a fixture at an incline, with a rake angle between −5 and −20 degrees in one embodiment, between −12 and −16 degrees in another embodiment. The rock used in the test was a member of the granite family of rocks.

The depth of cut was typically 0.005" to 0.020" in one embodiment, between 0.008 and 0.011" in another embodiment. The table rotated at a constant speed, between 20 and 80 RPM in one embodiment, between 60 and 80 RPM in another embodiment. The cross feed rate was held constant between 0.150" and 0.500" per revolution of the table in one embodiment, between 0.250" and 0.400" in another embodiment.

The constant table speed and increased cross feed rate resulted in a variable rate of surface feet of rock machined per minute throughout a pass across the rock, subjecting a cutter to a complex thermal cycle, which imparted a high thermal load on cutters at the beginning of each pass, and gradually decreased as the cutter moved towards the center of the table.

Figure 6:
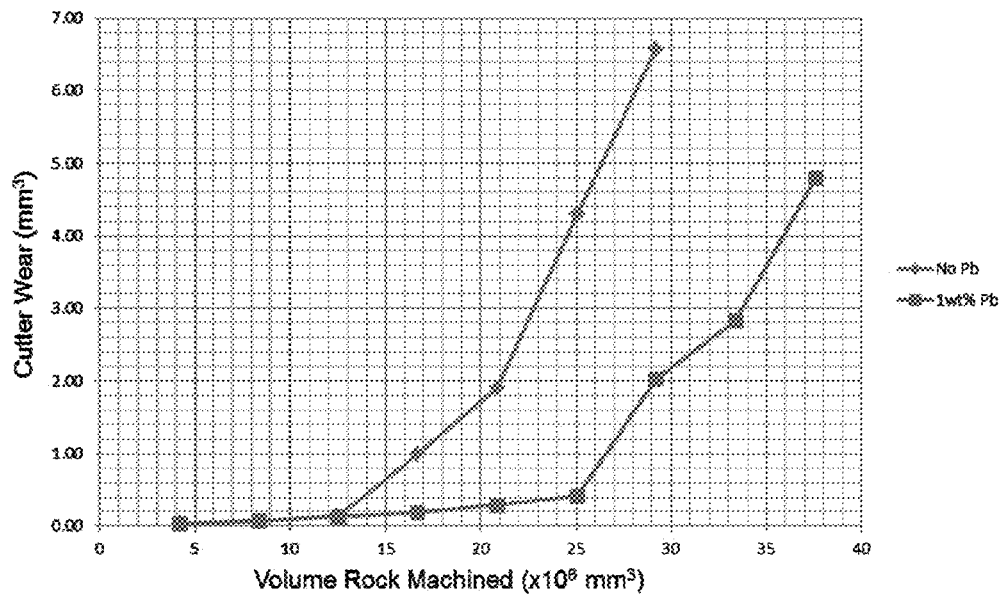
FIG. 6 shows a PDC cutter wear as a function of the volume or rock removed from the vertical torrent lathe (VTL) by the PDC cutter.

Cutters produced with and without lead were tested in a high thermal abrasion test, and the wear of the cutter was measured at predetermined intervals. FIG. 6 shows the cutter wear as a function of the volume of rock removed from the lathe by the cutter. The cutter containing 1 wt % lead machined 47% more rock to reach a cutter wear of 4 $mm^3$.

Example 2

Figure 7:
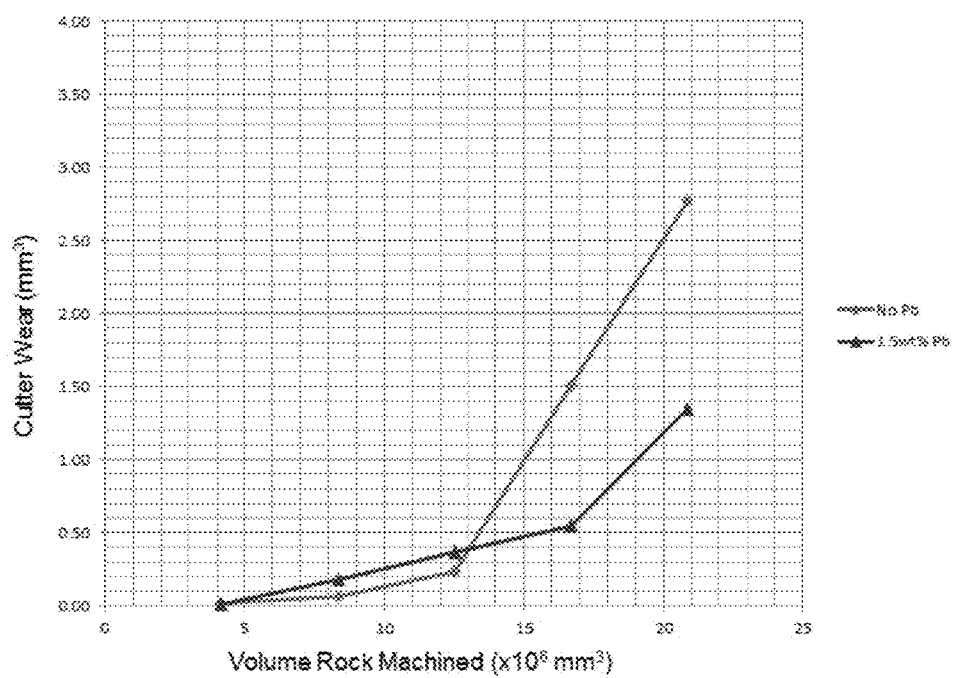
FIG. 7 shows the wear progress of PDC cutters illustrating the PDC cutter containing 1.5 wt % lead outperformed the PDC cutter which did not contain lead.

The procedure used in Example 1 was repeated with a coarser diamond grain size. Here, the average diamond particle size was about 22 microns, and was mixed with 1.5 wt % lead, based on the diamond weight. Again, cutters with and without lead additions were produced, and these cutters were tested in a high thermal abrasion test on the VTL. FIG. 7 shows the wear progress of these cutters where the cutter containing lead outperformed the cutter which did not contain lead. Here, the lead containing cutter machined about 27% more rock to reach about 1 $mm^3$ wear.

Example 3

Figure 8:
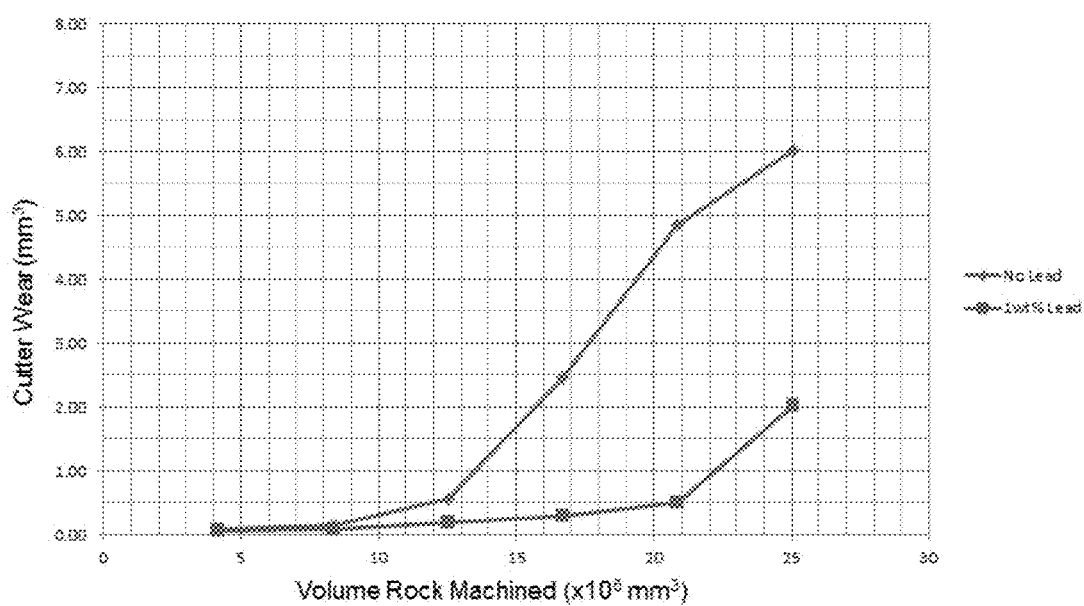
FIG. 8 shows the wear progress of PDC cutters illustrating the PDC cutter containing 1.0 wt % lead outperformed the PDC cutter which did not contain lead.

The procedure used in Examples 1 and 2 was repeated with a finer diamond grain size. Here the average diamond particle size was about 12 microns, and 1 wt % lead was mixed in, based on the diamond weight. Cutters with and without lead were produced and tested in the thermal abrasion test on the VTL, as shown in FIG. 8. The cutter containing lead machined about 58% more rock to reach a cutter wear of 2 mm$^3$ than the cutter without lead.

While reference has been made to specific embodiments, it is apparent that other embodiments and variations can be devised by others skilled in the art without departing from their spirit and scope. The appended claims are intended to be construed to include all such embodiments and equivalent variations.

We claim:

1. A superabrasive cutter, comprising:
   a polycrystalline diamond body comprising a plurality of diamond particles bonded to one another;
   about 0.01% to about 4% by weight of the diamond particles of a metal or metal alloy as evaluated prior to a high pressure high temperature process; and
   a catalyst that promotes diamond-to-diamond bonding of the diamond particles in the high pressure high temperature process,
   wherein the metal or the metal alloy is immiscible with the catalyst at sintering conditions in the high pressure high temperature process.

2. The superabrasive cutter of the claim 1, wherein the metal or metal alloy is lead or an alloy thereof.

3. The superabrasive cutter of the claim 1, further comprising a substrate attached to the polycrystalline diamond body.

4. The superabrasive cutter of claim 3, wherein the polycrystalline diamond body exhibits a gradient of metal or metal alloy with a higher concentration of metal or metal alloy at a top surface of the polycrystalline diamond body than at an interface surface formed between the polycrystalline diamond body and the substrate.

5. The superabrasive cutter of the claim 1, wherein the metal or metal alloy is present in an amount by weight of the superabrasive particles of less than about 2.0% as evaluated prior to the high pressure high temperature process.

6. The superabrasive cutter of the claim 1, wherein the metal or metal alloy is distributed throughout the polycrystalline superabrasive particles.

7. The superabrasive cutter of the claim 1, wherein the metal or metal alloy has a melting point lower than the catalyst.

8. The superabrasive cutter of claim 1, wherein the catalyst is selected from a Group VIII metal.

9. The superabrasive cutter of claim 1, wherein the catalyst is cobalt.

10. A method of making superabrasive cutter, comprising:
    mixing a metal or metal alloy with a plurality of diamond particles;
    wherein the metal or metal alloy is present in an amount by weight of the diamond material of about 0.01% to about 4% as evaluated prior to a high pressure high temperature process;
    providing a substrate attached to a superabrasive volume formed by the plurality of diamond particles with the metal or metal alloy, wherein the substrate comprises a catalyst; and
    subjecting the substrate and the superabrasive volume with the metal or metal alloy to conditions of elevated temperature and pressure in the high pressure high temperature process that is suitable for producing the polycrystalline diamond material,
    wherein the metal or metal alloy is immiscible with the catalyst at sintering conditions in the high pressure high temperature process.

11. The method of the claim 10, further comprising surrounding the diamond particles with the metal or metal alloy to protect the diamond particles from converting to graphite.

12. The method of the claim 10, further comprising increasing a density of the superabrasive volume by introducing the metal or metal alloy.

13. The method of the claim 10, wherein the metal or metal alloy is lead an alloy thereof.

14. The method of the claim 10, wherein the substrate is cemented tungsten carbide.

15. The method of the claim 10, further comprising sandwiching the diamond particles with mixture of the metal or metal alloy between the substrate and the diamond particles without mixing with the metal or metal alloy.

16. A superabrasive cutter, comprising:
    a plurality of diamond particles bonded to one another in a polycrystalline diamond body;
    a catalyst that promotes diamond-to-diamond bonding of the diamond particles in a high pressure high temperature process; and
    lead or an alloy thereof distributed throughout the polycrystalline diamond body wherein an overall concentration of the lead or alloy thereof is less than that of the catalyst.

17. The superabrasive cutter of the claim 16, wherein the lead or alloy thereof is present in an amount by weight of the diamond particles of less than about 2.0% as evaluated prior to a high pressure high temperature process.

18. The superabrasive cutter of the claim 16, further comprises a substrate attached to the polycrystalline diamond body formed by the diamond particles.

19. The superabrasive cutter of the claim 16, wherein the lead or alloy thereof is present in an amount by weight of the diamond particles of about 0.01% to about 4% as evaluated prior to a high pressure high temperature process.

20. The superabrasive cutter of the claim 16, wherein the lead or alloy thereof is present in an amount by weight of the diamond particles of less than about 1.0% as evaluated prior to a high pressure high temperature process.

21. The superabrasive cutter of the claim 16, wherein the lead or alloy thereof has a melting point lower than the catalyst.

* * * * *